J. W. SACKETT.
RECIPROCATING SCOOP DRAG.
APPLICATION FILED AUG. 30, 1912.
1,068,933.
Patented July 29, 1913.
3 SHEETS—SHEET 1.
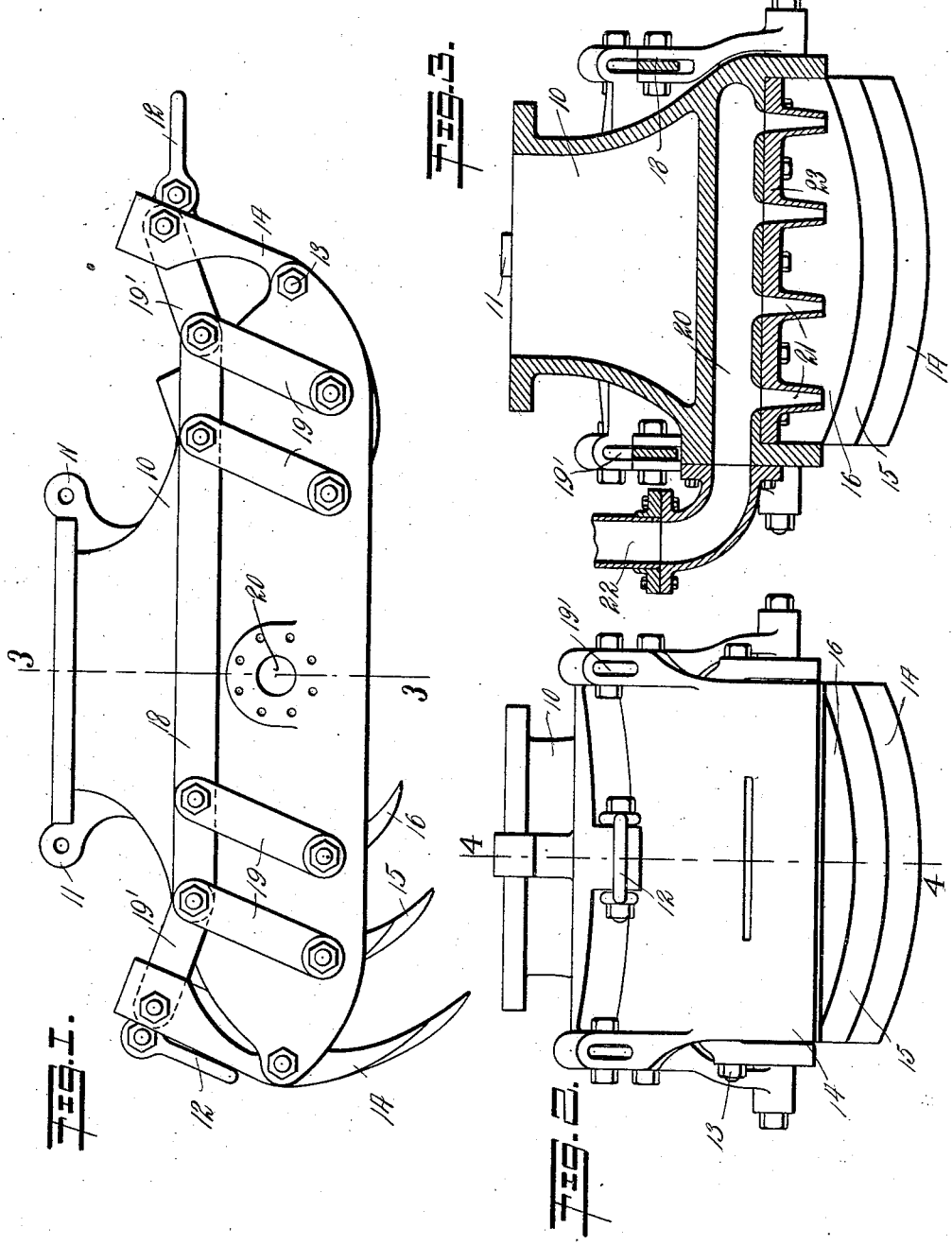
WITNESSES
G. Robert Thomas
Geo. L. Beeler
INVENTOR
John Warren Sackett
BY Munn & Co.
ATTORNEYS J. W. SACKETT.
RECIPROCATING SCOOP DRAG.
APPLICATION FILED AUG. 30, 1912.
1,068,933.
Patented July 29, 1913.
3 SHEETS—SHEET 2.
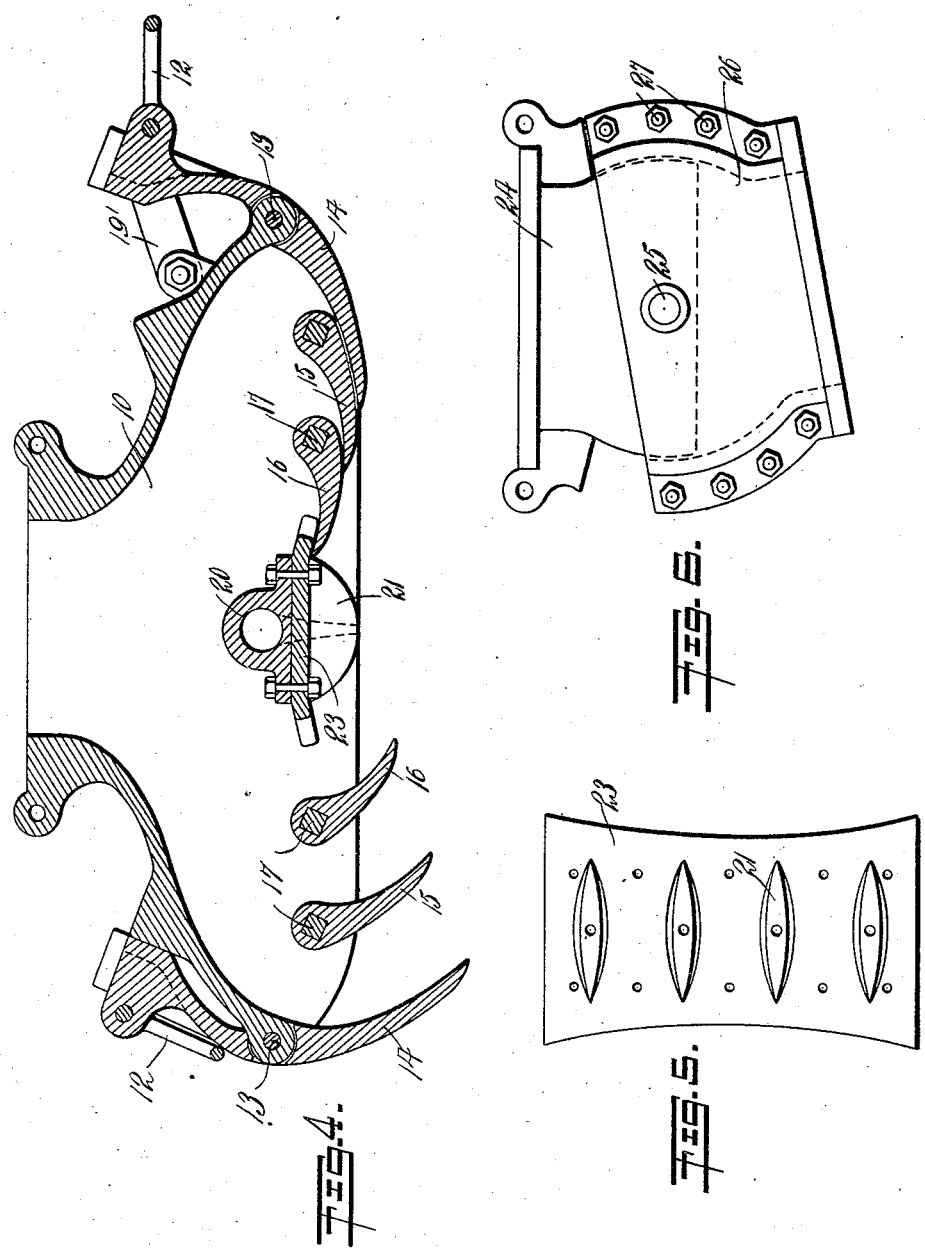
WITNESSES
G. Robert Thomas
Geo. L. Beeler
INVENTOR
John Warren Sackett
BY Munn & Co
ATTORNEYS J. W. SACKETT.
RECIPROCATING SCOOP DRAG.
APPLICATION FILED AUG. 30, 1912.
1,068,933.
Patented July 29, 1913.
3 SHEETS—SHEET 3.
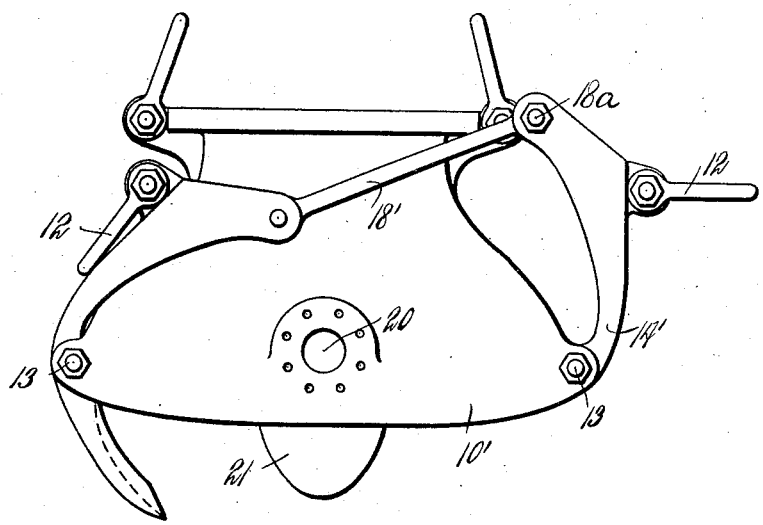
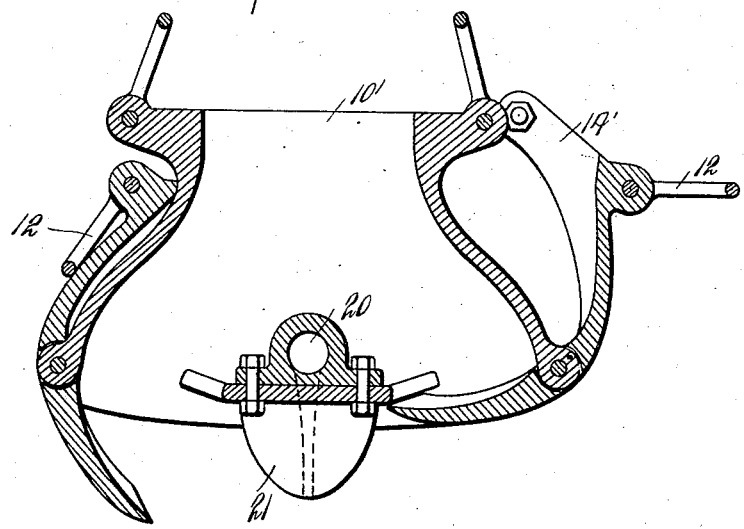
WITNESSES
G. Robert Thomas
Geo. L. Beeler
INVENTOR
John Warren Sackett
BY Munn & Co.
ATTORNEYS

UNITED STATES PATENT OFFICE.

JOHN WARREN SACKETT, OF JACKSONVILLE, FLORIDA.

RECIPROCATING-SCOOP DRAG.

1,068,933.  Specification of Letters Patent. Patented July 29, 1913.

Application filed August 30, 1912. Serial No. 717,885.

*To all whom it may concern:*

Be it known that I, JOHN WARREN SACKETT, a citizen of the United States, and a resident of Jacksonville, in the county of Duval and State of Florida, have invented a new and Improved Reciprocating-Scoop Drag, of which the following is a full, clear, and exact description.

This invention relates to hydraulic dredging machinery, and has particular reference to attachments for the lower end of the hydraulic pipe through which the dredged material, hereinafter referred to for convenience as mud, is to be conveyed.

Among the objects of this invention is to improve the mouth pieces for such pipes, whereby the same are better adapted for operating upon all kinds of bottoms; that is to say, whereby the operation of dredging may be carried on with the utmost speed and capacity of the machinery, and whereby the likelihood of breakage, damage or obstruction to the attachments will be reduced to a minimum.

The foregoing and other objects of the invention are attained by the mechanism hereinafter fully described and claimed, and illustrated in the accompanying drawings, in which similar characters of reference indicate corresponding parts in all the views, and in which—

Figure 1 is a side elevation of one form of the reciprocating scoop drag constituting the subject matter of this invention; Fig. 2 is a view of the same looking toward the left of Fig. 1; Fig. 3 is a vertical transverse section on the line 3—3 of Fig. 1; Fig. 4 is a vertical longitudinal section on the line 4—4 of Fig. 2; Fig. 5 is a bottom plan view of the cutter or guard support; Fig. 6 is a detail view in elevation of an attachment which may be used in connection with the drags; Fig. 7 is a side elevation of a slightly modified form of the invention; and Fig. 8 is a vertical longitudinal section of the same.

Referring particularly to the drawings, I show at 10 one form of mouth piece or hood which is adapted for attachment in any suitable substantial manner to the lower end of the suction pipe of a hydraulic dredge, it being understood in this art that such pipe will be extended into the sea or river to be dredged and maintained at any suitable angle with respect to the dredge or vessel which carries the operating pump and other mechanism. The mechanism just referred to constitutes *per se* no part of this present improvement, suffice it to say, however, that any well known rigging or tackle will be used to control the elevation of the hood, such tackle being connected as by means of the ears 11 at the upper portion of the hood.

At each end of the hood is connected in any suitable manner a clevis or ring 12, and the mechanism contemplates that there will be a draft cable or the like connected directly or indirectly to each of said rings, whereby the hood will be drawn laterally for digging or dredging operation; the draft being applied to said rings in alternation. The illustration in Fig. 1 represents the position of the movable parts when the drag is presumed to be drawn toward the right.

Pivotally connected by means of a transverse pivot 13 at each end of the hood is a part which may be called a scoop plate 14, the lower portion of which is adapted to extend downwardly into digging position, as indicated at the left in Fig. 1, or which may be folded into nested position, as indicated at the right of said figure. As shown in the first figures, when operating upon certain character of bottoms, as, for instance, the hard bottoms, I prefer to employ a series or set of auxiliary scoop plates 15—16, each inner plate being slightly shorter than the one next to it. The auxiliary plates are mounted upon shafts 17 so as to rotate therewith. All of the scoop plates are connected by means of a bar 18 and a series of links 19—19′ for simultaneous operation or reciprocation. The links 19′ are connected to the upper portions of the main scoop plates 14, and hence tension or draft upon a ring 12 will draw upon the bar 18, and through the several link connections above described will cause the scoop plates on that end of the hood opposite the ring just mentioned to be projected downwardly into digging position, and at the same time the scoop plates adjacent the advancing end of the hood will be nested, as indicated in Fig. 4. One of the primary advantages of this type of dredge drag is that when the device becomes clogged, as when operating upon stiff clay, the trouble may be relieved by reversing the draft upon the rings 12; that is to say, alternating the draft several times with the obvious result that the clogging material will be freed and yet the actual dredging operation will not be delayed nor interfered with in any way.

As shown at 20 I provide a means for introducing a stream of water under pressure, such water being directed downwardly through a series of nozzles 21 in comparatively small jets for the purpose of loosening the mud, such water being supplied in any approved manner through a connecting pipe 22. The nozzles 21 are of the peculiar form shown in the several figures, and as indicated particularly in Fig. 5, each of them is elongated in a direction parallel to the longitudinal axis of the hood, whereby the nozzles also constitute cutters for cutting or digging into the mud. Again, the series of cutters and the supporting means therefor constitute an effective guard, preventing the admission of large stones, wreckage, or other obstructions, which, if permitted to enter and pass through the suction pipe might damage the pump mechanism. The cutters 21 may be secured in place within the hood in any suitable manner, but as shown herein they are connected to, or may be integral with, a plate 23 bolted to the structure of the pipe 20. As indicated especially in Figs. 4 and 8, the plate 23 also serves as a positive stop to limit the inward movement of the pivoted scoops.

That form of the invention shown in Figs. 7 and 8 is of the same general nature with respect to the main scoop plates, which are coupled together for simultaneous reciprocation, the plates 14' in this instance being pivoted at 13, as above, and coupled together by means of a bar 18'. The rings 12 are pivotally connected to the upper portions of the plates 14', preferably at points intermediate the pivots 13 and the pivotal connections 18ª for the bar. The hood 10' in this form of the invention may be shorter than in the other case, but is provided preferably with a similar means for introducing water under pressure through the pipe 20 and cutters 21.

The attachment shown in Fig. 6 comprises a head 24 adapted to be rigidly connected to the lower end of the suction pipe, the said head being curved, and pivotally mounted at 25 thereon is an oscillatory cap 26 made in sections, bolted together at 27, and to which cap the hood 10 is connected or made integral. By this means the tension or draft upon the swinging cable on either end of the hood will not only result in closing the scoop or scoops on the side on which the tension is exerted and at the same time opening the scoop or scoops on the opposite side, but will also cause the end of the drag on which the draft is exerted to rise above the other end, thus presenting a more favorable position of the drag to the bottom being operated upon. In other words, in certain character of mud a greater degree of inclination of the digging ends of the scoop is necessary or desirable than at other times, and by the provision of the auxiliary attachment the apparatus may be arranged to suit the various conditions.

The several parts of this invention may be made of any suitable materials, and the relative size and proportions thereof may be varied to a considerable extent without departing from the spirit of the invention herein claimed.

Having thus described my invention, what I claim as new and desire to secure by Letters Patent is:—

1. In a reciprocating scoop drag, the combination of a hood, a pair of oppositely arranged scoop plates pivoted in the ends of the hood, means coupling said scoop plates together for simultaneous reciprocation, each of said scoop plates being adapted to operate while the other is carried out of operation, and guard means extending across the interior of the hood serving to limit the upward swing of the scoop plates.

2. In a reciprocating scoop drag, the combination of a hood, a plurality of scoop plates pivoted in said hood, means coupling said scoop plates together for simultaneous reciprocation in alternation, and a guard extending across the middle portion of the interior of the hood substantially parallel to the plate pivots coöperating with said scoop plates to prevent large obstacles from entering the hood.

3. In a reciprocating scoop drag, the combination of a hood, a main scoop plate pivoted in each end of said hood, said plates being arranged in opposite directions to each other, auxiliary scoop plates pivoted adjacent and substantially parallel to the aforesaid scoop plates, and means coupling all of said plates together for simultaneous reciprocation, the plates at one end being extended for digging operation while those at the other end are nested within the hood.

4. In a device of the character set forth, the combination of a hood, digging mechanism movably mounted in said hood, a plate extending across the interior of the hood and serving to limit the movement of the digging mechanism in one direction, and a series of cutter nozzles secured to and extending downwardly from said plate.

5. In a reciprocating scoop drag, the combination of a hood, digging mechanism movably mounted in said hood, and a combined cutter and guard mechanism within the hood coöperating with said digging mechanism, said combined mechanism including a series of cutter nozzles, substantially as set forth.

In testimony whereof I have signed my name to this specification in the presence of two subscribing witnesses.

JOHN WARREN SACKETT.

Witnesses:
CHAS. F. PAGE,
GEO. S. BOURNE.

Copies of this patent may be obtained for five cents each, by addressing the "Commissioner of Patents, Washington, D. C."